Figures 1, 2:
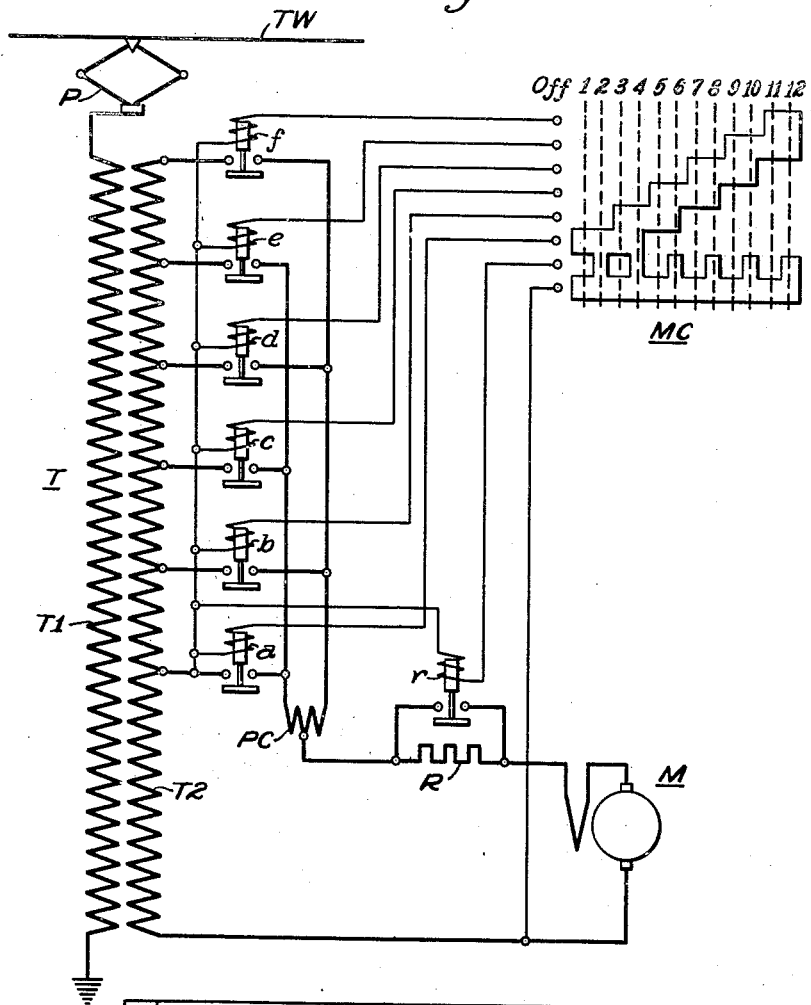

Feb. 21, 1950

W. L. BARCLAY, JR

2,498,236

CONTROL SYSTEM FOR ALTERNATING CURRENT MOTORS

Filed Aug. 21, 1947

| Sw. | Controller Position | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| a | O | O | O | O | | | | | | | | |
| b | | | O | O | O | O | | | | | | |
| c | | | | | O | O | O | O | | | | |
| d | | | | | | | O | O | O | O | | |
| e | | | | | | | | | O | O | O | O |
| f | | | | | | | | | | | O | O |
| r | O | | O | | O | | O | | O | | O | |

WITNESSES:
Robert C. Baird
[signature]

INVENTOR
William L. Barclay, Jr.
BY G. M. Crawford
ATTORNEY

Patented Feb. 21, 1950

2,498,236

UNITED STATES PATENT OFFICE 2,498,236

CONTROL SYSTEM FOR ALTERNATING CURRENT MOTORS

William L. Barclay, Jr., Scarsdale, N. Y., assignor to Westinghouse Electric Corporation, East Pittsburgh, Pa., a corporation of Pennsylvania Application August 21, 1947, Serial No. 769,839

4 Claims. (Cl. 323—43.5)

My invention relates, generally, to control systems and, more particularly, to systems for controlling the operation of alternating current electric motors which propel railway vehicles.

In order to accelerate an alternating current multiple unit car or locomotive from standstill it is necessary first to apply low voltage on the traction motors and then to increase the applied voltage by small steps until the desired speed is attained or until the maximum permissible voltage is applied on the motors. The voltage increments must be small, otherwise the increase in tractive effort in advancing from one notch to the next would result in rough points or bumps in the acceleration curve.

Usually a series of secondary taps are provided on the main transformer and the traction motors receive their voltage first from the lowest transformer tap and then from successively higher voltage taps as the controller is advanced to the full running position. In order that the main power circuit to the motors may be switched from one transformer tap to the next higher tap, one or more preventive coils are utilized to permit the changing of the taps without interrupting the motor circuit and without short circuiting a section of the transformer winding. If only one preventive coil is utilized the notching is not as smooth as when three preventive coils are provided.

Usually one switch is required for each transformer tap and additional switches are required for the preventive coils, the number varying with the particular circuit layout. Thus, for a large number of notches or steps a large number of transformer taps and switches are required. Present day trends are toward smoother acceleration, which means an increased number of notches, in order to meet the demands for greater passenger comfort and to obtain the maximum accelerating rate without incurring wheel slippage. There is less tendency for the wheels to slip when there are a large number of accelerating notches because the peak values of tractive effort are less than is the case with fewer notches.

An object of my invention, generally stated is to provide a motor control system which shall be simple and efficient in operation and which may be economically manufactured and installed.

A more specific object of my invention is to increase the number of notches or steps of an AC motor control system without increasing the number of taps on the transformer through which the power is supplied.

A further object of my invention is to reduce the voltage surges resulting from the switching operations in a preventive coil scheme of control.

Other objects of my invention will be explained fully hereinafter or will be apparent to those skilled in the art.

In accordance with one embodiment of my invention, a step of resistance or reactance is first inserted into the main motor circuit with each change of transformer taps and is then shunted from the circuit between tap changes. In this manner two accelerating notches are provided for each transformer tap instead of one, thereby doubling the total number of notches obtainable with a given number of transformer taps.

For a better understanding of the nature and objects of my invention reference may be had to the following detailed description taken in conjunction with the accompanying drawing in which:

Figure 1 is a diagrammatic view of a motor control system embodying the principal features of my invention; and Figure 2 is a chart showing the sequence of operation of certain of the switches illustrated in Fig. 1.

Referring to the drawing, the system shown therein comprises a traction motor M, which may be of the series type suitable for propelling an electric vehicle (not shown); a transformer T having a primary winding T1 and a secondary winding T2; a plurality of tap changing switches a, b, c, d, e, f; a preventive coil PC and a master controller MC.

The primary winding T1 of the transformer T may be energized through a current collector P which engages a trolley wire TW. The secondary winding T2 of the transformer is provided with a plurality of taps to which the tap changing switches a to f are connected.

In accordance with the usual practice, the preventive coil PC is provided to enable the tap changing operation to be performed without interrupting the circuit to the motor M and without short circuiting a portion of the transformer winding. The operation of the tap changing switches may be controlled in the usual manner by means of the master controller MC which causes the tap changing switches to be operated in sequential relation as the controller is advanced from the "off" to the full-running position.

As explained hereinbefore, in the usual tap changing system of the present type, one notch or accelerating step is obtained for each transformer tap or each tap changing switch. Thus, in the system illustrated six notches would be available. In order to increase the number of accelerating steps without increasing the number of transformer taps and tap changing switches, a current-limiting device, such as a resistor or reactor R, is connected in series-circuit relation with the motor M and a switch r is provided for shunting the current-limiting device R from the motor circuit between the tap changes.

As shown by the sequence chart in Fig. 2, the operation of the switch r is so controlled by the controller MC that the resistor R is introduced into the motor circuit during the closing of each tap changing switch and is then shunted from the motor circuit between the operation of the tap changing switches. In this manner two accelerating notches instead of one are provided for each transformer tap. By repeating the process of first introducing and then cutting out the resistance step with each successive transformer tap change, it is possible to double the number of notches obtainable with a given number of transformer taps.

An additional advantage of the scheme disclosed herein is the smoothing out of the acceleration curve by reducing the voltage surges normally caused during the tap changing operations in a system of the present type. Since the resistance R is always connected in the motor circuit when the transformer taps are changed, the voltage surges are reduced by the cushioning action of the resistance drop. The resistance drop automatically adjusts itself to provide a greater amount of cushioning action with large voltage changes and a lesser amount of cushioning action with smaller voltage changes. The over-all result is an acceleration curve which is smoother both because of the additional number of accelerating steps or notches and because the switching surges are automatically cushioned by the resistance drop in the motor circuit.

The present scheme may be utilized to increase the number of accelerating steps obtainable from a transformer having a given number of taps, without it being necessary to rewind the transformer to increase the number of taps. It will be seen that the only additional equipment required to be added to a system of the usual type is the resistor or reactor R, the switch r, and the necessary changes in the controller and the wiring to control the operation of the switch r. Thus, the present scheme is particularly suitable for modifying equipment which has previously been installed and on which it is desired to increase the number of accelerating steps.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system, in combination, a transformer having a plurality of taps thereon, a plurality of tap-changing switches operable sequentially to connect a load circuit to successive taps on the transformer, current limiting means, and switching means for causing the current limiting means to be inserted in series-circuit relation with the load circuit upon the closing of each tap-changing switch and shunted from the load circuit between closing operations of the tap-changing switches.

2. In a control system, in combination, a transformer having a plurality of taps thereon, a plurality of tap-changing switches operable sequentially to connect a load circuit to successive taps on the transformer, current limiting means, and switching means for causing the current limiting means to be inserted in series-circuit relation with the load circuit upon each change of transformer taps and shunted from the load circuit between tap changes.

3. In a control system, in combination, a transformer having a plurality of taps thereon, a plurality of tap-changing switches operable sequentially to connect a load circuit to successive taps on the transformer, current limiting means, switching means for causing the current limiting means to be inserted in series-circuit relation with the load circuit upon the closing of each tap-changing switch and shunted from the load circuit between closing the motor and shunted from the motor circuit operations of the tap-changing switches, and control means for controlling the operation of said tap-changing switches and said switching means.

4. In a control system, in combination, a transformer having a plurality of taps thereon, a plurality of tap-changing switches operable sequentially to connect a load circuit to successive taps on the transformer, current limiting means, switching means for causing the current limiting means to be inserted in series-circuit relation with the load circuit upon each change of transformer taps and shunted from the load circuit between tap changes, and a controller for controlling the operation of said tap-changing switches and said switching means.

WILLIAM L. BARCLAY, Jr.

REFERENCES CITED

The following references are of record in the file of this patent:

UNITED STATES PATENTS

| Number | Name | Date |
|---|---|---|
| 780,503 | Jackson | Jan. 24, 1905 |
| 875,584 | James | Dec. 31, 1907 |
| 1,764,376 | Whittaker | June 17, 1930 |
| 1,922,737 | Jungk | Aug. 15, 1933 |
| 2,101,880 | Taliaferro | Dec. 14, 1937 |

FOREIGN PATENTS

| Number | Country | Date |
|---|---|---|
| 448,132 | Germany | Aug. 10, 1927 |